March 4, 1969     P. D. SANTILHANO     3,431,385
METHOD OF WELDING
Filed Nov. 6, 1964

INVENTOR.
Philip D. Santilhano
BY *J. Maguire*
ATTORNEY

United States Patent Office 3,431,385
Patented Mar. 4, 1969

3,431,385
METHOD OF WELDING
Phillip D. Santilhano, Renfrew, Scotland, assignor to Babcock & Wilcox, Limited, London, England, a corporation of Great Britain
Filed Nov. 6, 1964, Ser. No. 409,592
U.S. Cl. 219—73            9 Claims
Int. Cl. B23k 9/18, 25/00

ABSTRACT OF THE DISCLOSURE

A method of welding in which weld metal is deposited into a gap having substantially parallel sides defined by a workpiece. One or more electroslag welding electrodes are provided to feed an electroslag pool in the gap, each electrode being arranged in one or more planes substantially transverse to the longitudinal length (depth) of the gap, and extending at least partially into the gap, remote from a centerline drawn through the longitudinal length of the gap.

Background and summary of the invention

This invention relates to a method of welding by the electroslag process; and it has for an object to minimize cracking of the weld at increased welding speeds.

Electroslag welding is a process in which opposed upright metal workpiece surfaces are welded together by forming a pool of molten metal covered by a layer of molten slag in a welding zone or gap between the surfaces at the sides thereof, the pool being continuously supplied with molten metal from one or more current-conducting welding wires fed into the slag layer. The I²R effect in the welding wire produces sufficient heat to melt the metal of the welding wire.

Assuming an elongated gap, the pool is confined at the sides of the gap by surfaces of the workpieces, and the open ends of the gap are closed by shoes which are normally water-cooled and are movable along the gap as the welding proceeds.

In the conventional method of electroslag welding, one or more welding wires are disposed centrally between the sides of the gap, and the welding speed usually must be limited to eleven feet per hour or less in order to minimize the possibility of cracking at the center of the weld.

An example of electroslag welding by the conventional method is shown in FIG. 2 of U.S. Patent No. 3,024,352, issued Mar. 6, 1962, to F. G. Danhier, wherein a plurality of side-by-side electrodes are serially disposed in upright position along the centerline of the gap with their tips inserted in the pool while the welding proceeds from bottom to top.

The present invention involves the recognition that the reason welding speed must be limited to prevent cracking when conventional welding methods are employed is because of the steep or sharply peaking temperature gradient across the width of the gap which results from the use of one centrally located wire or a series of wires extending along the longitudinal center of the gap. The present invention also involves the recognition that with a more nearly flat or gently sloping temperature gradient there would be less tendency to center weld cracking, and higher welding speeds would be obtainable without such risk of cracking.

According to the invention, this desirable temperature gradient can be obtained if weld metal is deposited by the electroslag process utilizing an electrode arrangement whereby weld metal is fed into the slag pool on opposite sides of a centerline parallel to the sides of the gap, the limits of the electrode arrangement in a direction transverse to the gap being remote from the centerline.

Description of the preferred embodiments

Figure 1:
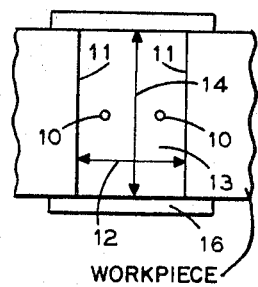
FIG. 1 is a top plan view of an embodiment of the invention.
Figure 2:
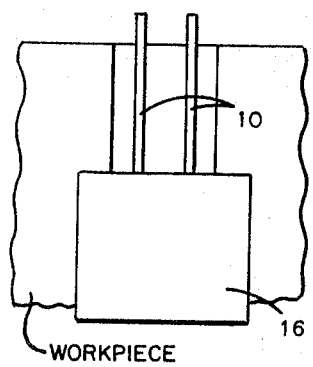
FIG. 2 is a side elevation view of the embodiment shown in FIG. 1.

Referring now to the drawings wherein like reference characters designate like or corresponding parts throughout the several views there is shown in FIG. 1 a mode of carrying out the method, electrode wires 10 spaced from one another and from the sides 11 of the gap 12 are disposed side by side on a line transverse to the gap.

With this arrangement weld metal is fed into the slag pool 13 from a series of electrodes 10 extending transverse to the longitudinal extent or depth 14 of an elongated gap or welding zone, with the result that longitudinal heat dispersal is spread across a broad front and the isotherm at the weld is flat or gently sloping.

Figure 3:
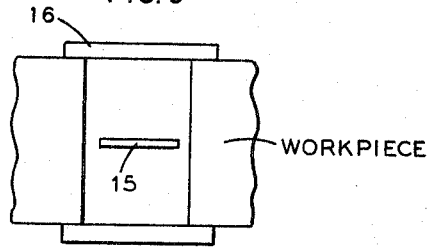
FIG. 3 is a top plan view of a second embodiment of the invention.
Figure 4:
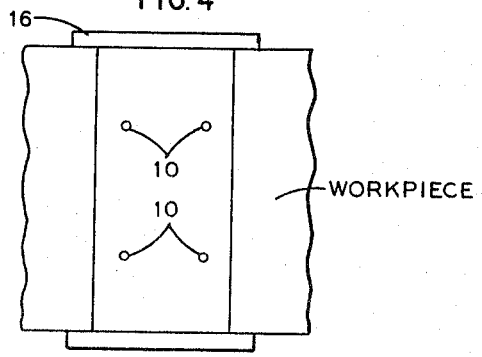
FIG. 4 is a top plan view of a third embodiment of the invention.
Figure 5:
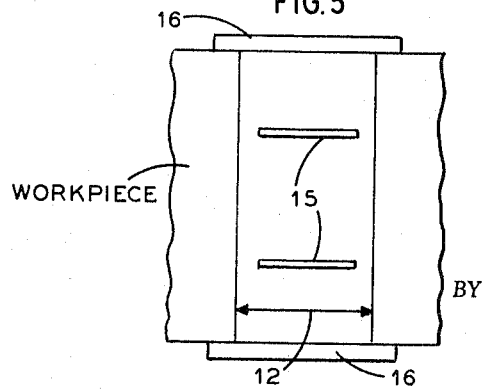
FIG. 5 is a top plan view of a fourth embodiment of the invention.

In FIG. 3 another embodiment of the invention is shown in accordance with the present invention, an alternate method of welding by the electroslag process being to dispose an elongated welding strip 15 transversely of the longitudinal extent of the gap, with the ends of the strip spaced from the sides of the gap. This arrangement operates similar to the arrangement previously described wherein the tips of a series of electrodes are arranged transverse to the longitudinal extent of the gap, with the heat dispersing along a broad front towards the ends of the gap, and thereby producing a flat or gently sloping temperature gradient between the sides of the gap.

Thus, by way of example, two similar electrode wires disposed side by side are provided with guide means, feed roller means (not shown) for feeding the wires at the same rate to the slag pool, and current supply means for supplying equal currents to the wires in parallel, so that the wares have the same polarity.

When welding with the two wires as described, the isotherm of the weld metal at the weld, instead of rising to a sharp peak as when a single centrally disposed wire is used, is flat-topped and it is found that the tendency to center weld cracking is reduced up to a speed much greater than eleven feet per hour.

As described in my copending patent application Ser. No. 320,842, filed Nov. 1, 1963, it is preferred that the deposited weld metal be cooled at a rate such that the time the weld at any location exceeds a temperature of 700° C. is so limited that a fine grain structure weld is produced. Suitably, no part of the weld exceeds a temperature of 700° C. for a time greater than three minutes, or preferably a time greater than two minutes, although if a grain growth inhibiting substance is introduced into the weld the time may be extended up to five minutes.

As described in the cited copending application, the power input to the weld is sufficient to give a speed of at least eight feet per hour, and may be such as to give a speed of between 15 and 25 feet per hour.

The gap has a width no greater than ⅞ of an inch, and preferably no greater than ¾ of an inch, and the weld metal is deposited using a direct current electric supply. The flux used is a high conductivity flux and the voltage of the power input is between 28 and 36 volts, and preferably in the range of between 32 and 34 volts, the current supplied being appropriate to the desired high rate of deposition of weld metal. If desired, to increase the rate of heat extraction from the welded workpiece, the ends of the gap during deposition of the weld metal may be closed by shoes cooled with fluid at a temperature less than zero on the centigrade scale.

With larger depths of gap, weld metal is fed into the slag pool at a plurality of locations spaced across the depth of the gap. Thus a plurality of pairs of electrode wires may be used at respective locations spaced across the depth of the gap and are suitably connected with adjacent pairs of wires having opposite polarity.

In an alternative mode of carrying out the invention, an electrode in the form of a strip is fed into the gap with the strip extending transversely of the gap and the edges of the strip spaced from the sides of the gap. Appropriate rollers and guide means are provided for feeding the strip to a slag pool and current supply means are arranged to supply current to the strip.

Whilst this alternative mode advantageously may be used in cojunction with the method described and claimed in the above mentioned specification, and a weld of fine grain structure produced, it has been found that certain alterations in the welding parameters may be effected when using an electrode in strip form. Thus, since the surface area per unit length of a strip electrode is very much greater than that of a wire electrode, it is possible to increase the welding current strength to as high as 1500 amps, thereby permitting a relatively rapid rate of deposition of weld metal, which rapid rate of deposition ensures that the weld is cooled at a speed sufficient to ensure the production of a weld of fine grain structure. Generally, a current of 1000 amps is found to be suitable, although acceptable results are obtained with currents having a strength greater than 600 amps provided the dimensions of the weld gap are small enough for an acceptable rate of deposition of weld material to be maintained. Preferably the welding voltage is a D.C. voltage.

Removal of heat from the weld is assisted by the increased surface area per unit length of the strip electrode compared with that of a wire electrode, in that heat is conducted up the electrode away from the weld. This has the additional advantage that the electrode is heated by conduction prior to entry into the weld pool.

Since the cross-sectional form of the strip electrode facilitates the removal of heat from the weld, as described above, it is possible to obtain a weld of fine grain structure using a strip electrode in conjunction with a gap of a value normal in the conventional method of electroslag welding of 1¼" to 1⅜". Such a width of gap facilitates the positioning of the electrode guide means and the copper cooling shoes and is advantageous particularly when welding a seam to which access on one side thereof is restricted, such as a circumferential weld on a pressure vessel or a longitudinal weld on a pressure vessel of small diameter. In the latter case, the width of the strip then is suitably ⅝" but it may vary, for example, between ¼" and ⅞" in other instances.

Whilst a flat strip electrode is most convenient to manufacture and use, in certain circumstances it may be preferable to use electrodes in corrugated strip form or in tubular form in order to increase the ratio of surface area to unit length for an electrode of uniform overall width.

The thickness of the strip may be in the range of between 0.015" and 0.094", although with a strip of or approaching the lower limit of thickness guiding means may be required to avoid buckling of the thin strip; and, therefore, the preferred strip thickness is in the range of between 0.025" and 0.030".

A single strip is suitable for use with thicknesses of plate material up to 2", but above that thickness it is advantageous to use more than one strip. Thus, for example, with a plate thickness above 2" and up to 4½" two strips are suitably used, with one strip at a positive polarity and the other strip at a negative polarity.

Advantageously, the or each strip is oscillated back and forth in longitudinal direction within the elongated gap to reduce the spacing from time to time between each copper shoe 16 at a side of the thickness of the workpieces and the strip or the adjacent strip to ½". With two oppositely polarized strip electrodes being oscillated within the gap, it is preferred that the dwell time at the end of the oscillatory strokes be unequal, with the longer dwell at the end of the stroke adjacent the negative electrode, in order to obtain a uniform fusion of the weld metal with the workpieces. Alternatively, the speed of oscillation may be varied across the depth of the gap.

Plate thickness above 4½" and up to 24" may be welded by the method using three strips and, where the plate thickness is greater than 8", oscillating the strips forwardly and rearwardly, or longitudinally, within the elongated gap such that the strips traverse substantially the whole of the distance between copper shoes at the front and rear of the gap with the middle strip at one polarity and the outer strips at the other polarity. Suitably the middle strip is at negative polarity.

The method is especially well suited to welding together workpieces respectively of mild steel, low alloy steel or austenitic stainless steel.

By way of example, a weld having a grain structure of a fineness such as to be acceptable under the British Standard Specification 1500 boiler code was produced in a gap having a width of 1⅜" and a depth of 4½" using two strip electrodes each ⅝" in width and .025" thick and supplied with a power of 34 kilowatts at a voltage of 34 volts and a direct current of 1000 amps giving a welding speed of 8 feet per hour. The strip electrodes had an analysis as follows:

| | Percent |
|---|---|
| Carbon | 0.09 |
| Silicon | 0.19 |
| Manganese | 1.92 |
| Sulphur | 0.021 |
| Phosphorus | 0.021 |
| Nickel | 0.15 |
| Chromium | 0.15 |
| Molybdenum | 0.02 |
| Copper | 0.32 |
| Tin | 0.02 |
| Iron | Remainder |

The welding flux used had an analysis as follows:

| | Percent |
|---|---|
| $SiO_2$ | 46.21 |
| MnO | 34.5 |
| $CaF_2$ | 7.63 |
| $Al_2O_2$ | 5.06 |
| MgO | 4.9 |
| $Fe_2O_3$ | 1.54 |
| $K_2O$ | 0.06 |
| $Na_2O$ | 0.05 |
| $TiO_2$ | 0.05 |

Because of the opposite polarity of the strips it is preferred that the dwell time at the end of the oscillatory strokes be unequal. In the present case the traverse time was 3 seconds with no dwell at the end of the stroke adjacent the positive electrode and with a dwell of 3 seconds at the end of the stroke adjacent the negative electrode.

Although the invention has been described in but several forms, it will be obvious to those skilled in the art that it is not so limited, but that it is susceptible of various changes and modifications without departing from the spirit thereof, as covered by the following claims.

What is claimed is:

1. In a method of welding by the electroslag process wherein weld metal is deposited into a gap utilizing an electrode arrangement, said method including the steps of: arranging a plurality of electrodes transverse to the gap, feeding weld metal into the slag pool at two locations spaced transversely across the depth of the gap, supplying the locations with welding current at opposite polarities, and oscillating the electrodes back and forth within the gap, with the time spent in the end portion of the gap adjacent the electrode of negative polarity being greater than the time spent in the opposite end portion of the gap so as to produce a substantially uniform fusion of the weld with the workpieces across the depth of the gap.

2. A method as claimed in claim 1, wherein the electrodes are oscillated with a greater period of dwell at the end of the gap adjacent the electrode of negative polarity than at the other end of the gap.

3. A method of welding as claimed in claim 1, wherein the deposited weld metal is cooled at a rate such that the time the weld at any location exceeds a temperature of 700° C. is so limited that a fine grain structure is produced.

4. A method of welding as claimed in claim 1, wherein the power input to the weld is sufficient to give a welding speed of at least eight feet per hour.

5. A method of welding as claimed in claim 1, wherein the power input to the weld is sufficient to give a welding speed of between 15 and 25 feet per hour.

6. A method of welding as claimed in claim 1, including the preliminary step of spacing the workpieces to provide a gap width no greater than ⅞ of an inch.

7. A welding method in accordance with claim 1, including the steps of closing the ends of the gap, during deposition of the weld metal, by hollow shoes, and supplying said shoes with fluid at a temperature less than zero on the centigrade scale.

8. A method of welding as claimed in claim 1, wherein the voltage of the power input is a D.C. voltage of less than 36 volts and at least 28 volts.

9. A method of welding by the electroslag process in which weld metal is deposited into a gap, comprising the steps of:
  spacing workpieces to provide a gap therebetween having a width no greate than ⅞ of an inch,
  closing the ends of the gap with hollow shoes,
  providing a plurality of electrodes,
  arranging said electrodes in a direction transverse to the gap in spaced relation to one another and the sides of the gap,
  feeding weld metal into a slag pool at spaced locations across the depth of the gap,
  supplying current at opposite polarities to the electrodes at a value of between 600 amps and 1500 amps with a D.C. voltage of less than 36 volts and at least 28 volts,
  supplying a cooling fluid to said shoes at a temperature less than zero on the centigrade scale,
  oscillating the electrode back and forth within the gap with a greater period of dwell at the end of the gap adjacent the electrode of negative polarity than at the other end of the gap,
  and welding with said electrodes along said gap at a speed of between 15 feet per hour and 25 feet per hour.

References Cited

UNITED STATES PATENTS

| | | | |
|---|---|---|---|
| 2,658,162 | 11/1953 | Tichenor et al. | 219—130 X |
| 2,848,593 | 8/1958 | Newman et al. | 219—73 |
| 2,906,861 | 9/1959 | Lesnewich | 219—135 |
| 3,243,568 | 3/1966 | Burden | 219—73 |
| 3,247,357 | 4/1966 | Koch | 219—126 |
| 3,258,575 | 6/1966 | Santilhano | 219—73 |

RICHARD M. WOOD, *Primary Examiner.*

J. GREGORY SMITH, *Assistant Examiner.*

U.S. Cl. X.R.

219—126